Figure 1:
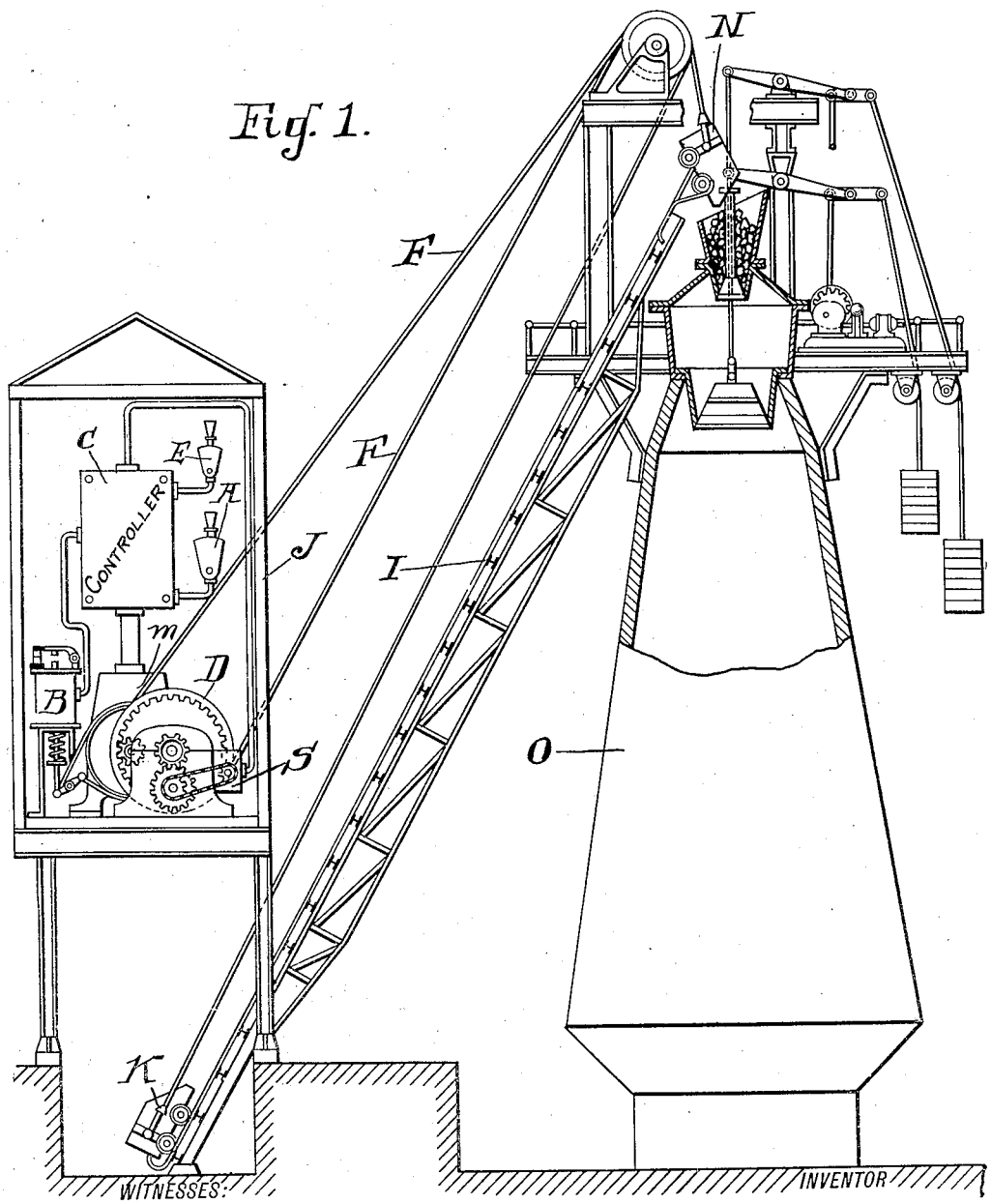

D. L. LINDQUIST.
ALTERNATING CURRENT MOTOR CONTROL.
APPLICATION FILED JUNE 5, 1913.

1,190,924.

Patented July 11, 1916.
4 SHEETS—SHEET 3.

WITNESSES:

INVENTOR
David L. Lindquist

BY
L H Campbell
ATTORNEY

D. L. LINDQUIST.
ALTERNATING CURRENT MOTOR CONTROL.
APPLICATION FILED JUNE 5, 1913.

1,190,924.

Patented July 11, 1916.
4 SHEETS—SHEET 4.

UNITED STATES PATENT OFFICE.

DAVID L. LINDQUIST, OF YONKERS, NEW YORK, ASSIGNOR TO OTIS ELEVATOR COMPANY, OF JERSEY CITY, NEW JERSEY, A CORPORATION OF NEW JERSEY.

ALTERNATING-CURRENT-MOTOR CONTROL.

1,190,924.   Specification of Letters Patent.   Patented July 11, 1916.

Application filed June 5, 1913. Serial No. 771,803.

*To all whom it may concern:*

Be it known that I, DAVID L. LINDQUIST, a subject of the King of Sweden, residing in Yonkers, in the county of Westchester and State of New York, have invented a new and useful Improvement in Alternating-Current-Motor Control, of which the following is a specification.

My invention relates to alternating current motors, and the same is particularly adapted to a furnace or skip hoist, in which an alternating current motor is used for power.

An object of the invention is the provision of a novel system of electrical control for an alternating current motor by means of a direct current.

Another object of the invention is the provision of automatic and improved means for controlling an alternating current motor in starting, accelerating, slowing down and stopping by the use of direct current generated in part from the motor itself.

A further object of the invention is the provision of an alternating current motor of novel design for operating a furnace or skip hoist, said motor comprising high and low speed windings which are for the purpose of affording a variable motor speed during the operation of the hoist, and automatic means for controlling the said motor windings so as to attain the desired results.

Other objects of the invention will appear hereinafter the novel combinations of elements being pointed out in the appended claims.

In a furnace or skip hoist, the motor must necessarily be of large size and of great power owing to the very heavy unbalanced load which the motor is called upon to handle. The unbalanced load may, and ofttimes does, amount to several tons and the same must be carefully handled, particularly at or near the limits of travel of the hoist, so as to insure that the load carrying device or loaded skip will come to rest directly over the furnace bell in proper position for dumping, regardless of the load and speed of the motor. This result may be effected more or less satisfactorily when the hoisting motor is a direct current machine, but when the hoist is to be operated by an alternating current motor, the desired result is much more difficult to attain. In slowing down or stopping, a direct current motor, effective use is made of the dynamic brake action of the motor when the same is driven by the load and acting in the capacity of a generator or dynamo, but with an alternating current motor, this dynamic brake action is not available, since an alternating current hoisting motor will not operate as a self exciting dynamo or generator. Then again, it is much more difficult to obtain different positive speeds with an alternating current motor, as compared with a direct current motor, particularly when it is necessary to come down to a very slow definite speed before stopping which is required when supplying power to a furnace or skip hoist having both positive and negative loads.

In addition to the difficulties above outlined in connection with an alternating current motor of the usual construction, it is well known that electro-responsive devices such as magnet switches when operated by an alternating current are inferior to those which use a direct current in their magnet windings, since not only do they have a tendency to consume an excessive amount of current, but they are very liable to become overheated when slightly out of adjustment.

I purpose to overcome all of the objectionable features which are attendant upon the use of alternating current apparatus and to attain the desired end I purpose using direct current through the various electro-responsive devices of the hoisting system generated in part from the motor itself and part supplied by a separate source of direct current supply. I purpose further to use an alternating current motor employing a double set of windings to vary the number of poles of the motor, according to the well known principle of operation of alternating current induction motors, whereby the speed of the motor may be increased or reduced by varying the number of poles, other conditions remaining the same.

Figure 2:
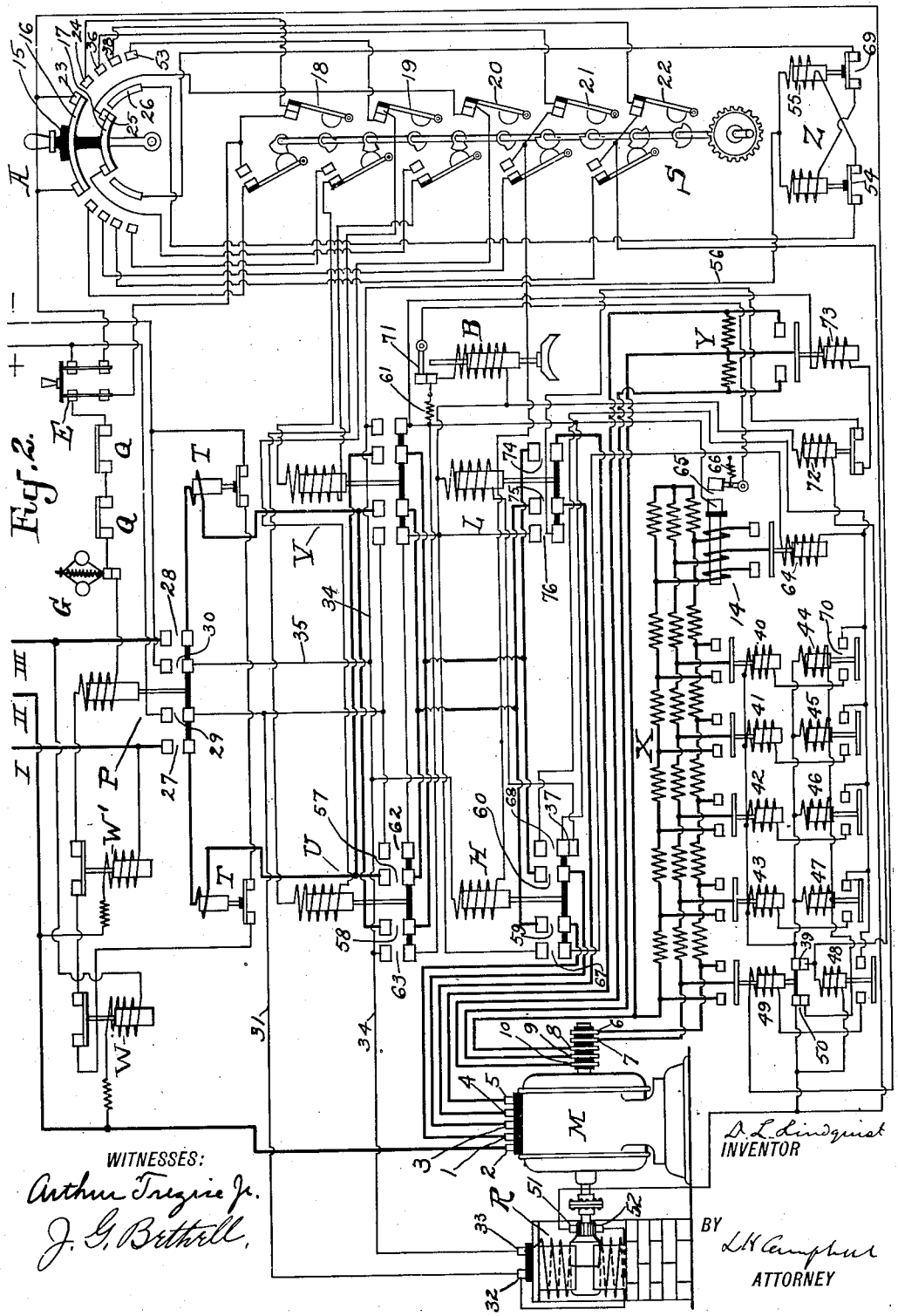
Figure 3:
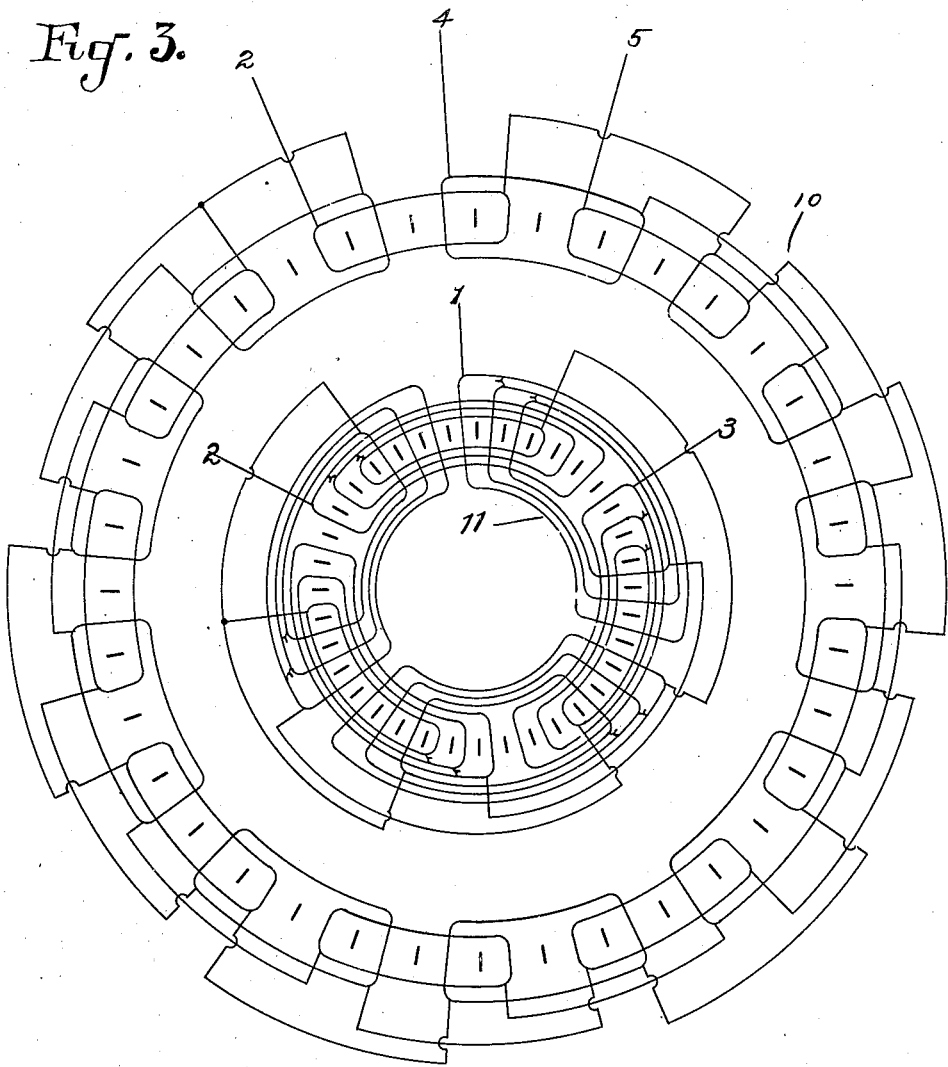
Figure 4:
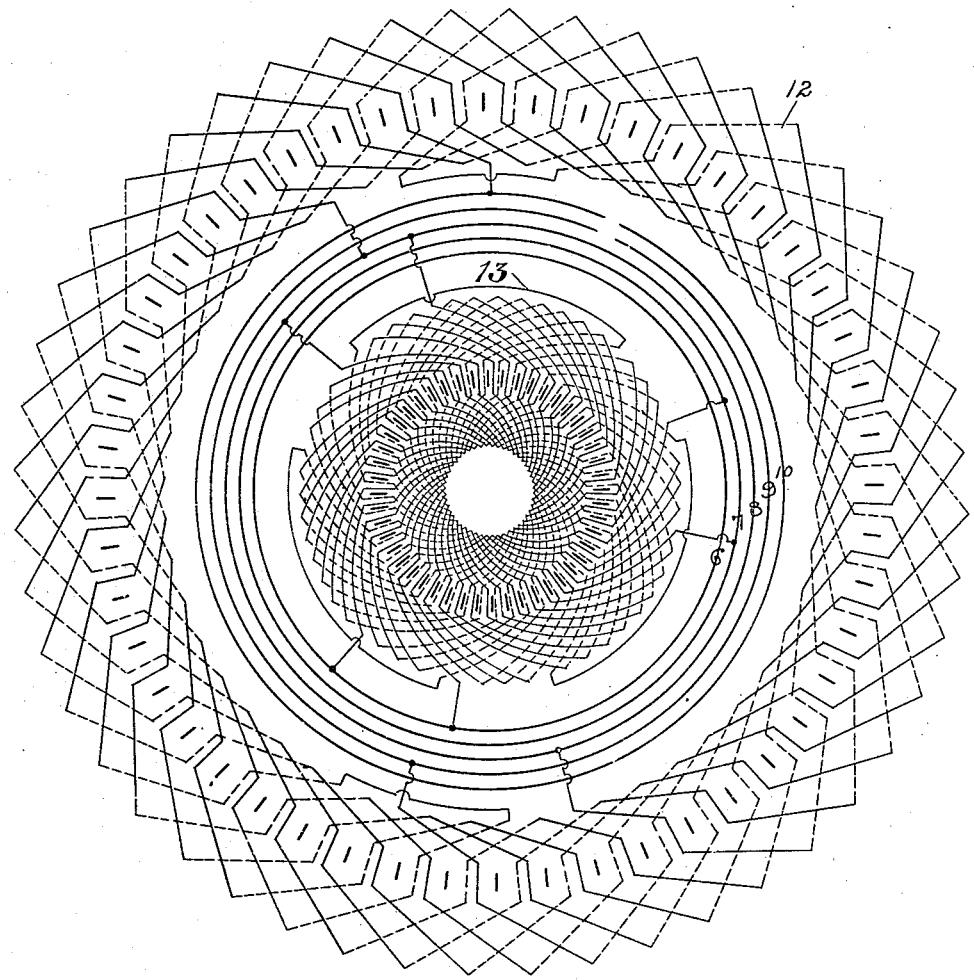

In the drawings, Figure 1 represents a furnace or skip hoist containing an embodiment of the invention; Fig. 2 is a wiring diagram showing the various electrical circuits and mechanism controlled thereby; Fig. 3 represents the high and low speed stator windings of the motor; Fig. 4 represents the high and low speed rotor windings of the motor.

Like reference characters denote similar parts in all of the figures.

Referring to Fig. 1, a blast furnace O is adapted to be periodically charged with ore, limestone, coke, etc., by means of the skips K and N which travel simultaneously in opposite directions over the inclined tracks I. The skips K and N are both connected to opposite ends of a cable or cables F which are wrapped about a winding drum D operated by an alternating current motor M through internal spur gearing as shown, or by any other desirable mechanical driving connection such as worm gearing, etc. The motor and drum are housed in a power house J which is preferably located at the lower end of the incline so that the operator may have an unobstructed view of the skips during the entire operation of the hoist. The power house J contains all of the electrical hoisting machinery which comprises a controller C, brake B, automatic stop motion switch S, which is driven by reduction gearing from the winding drum shaft, a small direct current generator or dynamo R directly coupled to the shaft of the main hoisting motor (see Fig. 2), master switch A and emergency switch E.

Before taking up the description of the wiring diagram shown in Fig. 2, I will first point out the arrangement of the motor windings as illustrated in Figs. 3 and 4. The motor is provided with two stator windings of the closed coil or chain type, one of which designated by the numeral 10 is arranged for twelve poles, and is used for slow motor speeds and to obtain a definite speed in slowing down prior to stopping. The other stator winding is designated by the numeral 11 and is arranged for four poles, which winding is used in starting and running at full or high speeds. In Fig. 4 are shown the rotor windings 12 and 13, both of which are of the well known wave type of windings, and one of them, the winding 12, is arranged for twelve poles giving a slow motor speed, while the other winding 13 is arranged for four poles, giving a high motor speed. The motor windings 10 and 12 act in conjunction to give a slow speed to the motor, while the windings 11 and 13 act together to give a high speed. The rotor is provided with five slip rings 6, 7, 8, 9 and 10, one of which, 8, is common to both rotor windings. The high speed rotor winding 13 is connected three phase, while the low speed rotor winding 12 is connected two phase, with the two phases connected together and one common lead brought out, the slip rings affording a convenient means for inserting a variable resistance in either of the rotor windings, as will be pointed out later in connection with Fig. 2. The stator windings 10 and 11 each have three leads, 2, 4, 5 and 1, 2, 3, respectively, the common lead 2 of each winding being connected together.

While the above motor windings are arranged for four and twelve poles, respectively, these numbers are entirely optional and may be varied at will to suit various conditions and are shown as four and twelve pole windings merely for purposes of illustration, the principle being the same for windings giving a greater or less number of poles and for windings wound in other than closed coil or wave windings.

Referring to Fig. 2, a potential switch P is arranged to complete a circuit from the three phase mains I. and III. through the windings of the overload magnet switches T—T to the contacts of the reversing switches U and V. The high and low speed stator windings of the motor are controlled by the speed switches H and L, respectively, while X is a sectional resistance in the high speed rotor winding circuit, and Y is a resistance in the low speed rotor winding. A safety relay 14 controls a circuit to the magnet winding of the brake B and is for the purpose of preventing the brake from being released to permit the motor to start unless and until all of the motor phases are intact and alive. The master switch A comprises a switch lever 15, which moves a pair of contact segments 16 and 17 into engagement with a series of corresponding fixed or stationary contacts. The stop motion switch S is operated from the winding drum shaft, and effects the opening and closing of a double series of cam operated switches such as 18, 19, 20, 21 and 22; one series of switches operating for one direction of travel of the hoist, and the other set for a reverse movement of the hoist. A pair of non-interference magnet switches are shown at Z and their function is to prevent both reversing switches being energized and closed at the same time, and to prevent a false operation. A governor G may be driven by any moving part of the hoist, such as the motor or winding drum shaft, and its function is to effect the cutting off of the supply circuit in case of excessive speed of the hoist. "Up" and "down" limit switches are shown at Q—Q, while W and W' represent no-voltage release magnets for effecting the opening of the main line circuit in case any one of the phases is inactive or defective or in case of excessive drop in line potential. A suitable source of constant potential direct current is designated by the characters + and —, while a source of variable potential direct current is generated by the dynamo R, which, as before pointed out, is coupled directly to the shaft of the main hoisting or alternating current motor M, and has its field winding excited with direct current from the source of current designated by + and —. Direct current is used throughout all of the magnet windings of the various switches with the exception of the safety magnet switch 14 and the no-voltage switches W and W' whose windings are connected across the alternating current mains II and III and I and II, respectively.

The operation of the system may be seen by moving the master switch lever to the right, for example, so that the contact segment 16 bridges the stationary contacts 23 and 24, and the contact segment 17 bridges the stationary contacts 25 and 26. A circuit may now be traced from the + operating main, through the switch E, contacts 23 and 24, contacts of stop motion switch 18, left hand contacts of switch E, limit switches Q—Q, governor switch G, winding of switch P, contacts of no-voltage magnet switch W' and W in series, contacts of the overload switches T—T, and to the — main. The switch P is now energized to close its contacts 27 and 28 and contacts 29 and 30. The closing of the former contacts effects no results, since the reversing switch contacts are in open position. The closing of the contacts 29 and 30 completes a circuit to the field winding of the small generator or dynamo R, through the wire 31, field terminal 32, field winding of the dynamo, field terminal 33 and by wires 34 and 35 to the contacts 30. The dynamo field is now energized, but the dynamo does not generate at this time, since the main motor is at rest. The operator next moves the master switch so that the contact segment 16 engages the contact 36 and closes a circuit from the + operating main through the contacts of the stop motion switch 21, through the magnet winding of the high speed switch H, and by the wires 34 and 35 and contacts 30 to the — operating main. The high speed switch now closes its contacts and opens the contacts 37, one of which is connected to one terminal of the magnet winding of the slow speed switch L to prevent the simultaneous energization of both the high and low speed switches. This operation is merely preparatory since the motor circuit is still open at the reversing switch contacts. The master switch is next moved so as to energize the contact 38, thereby closing a connection from the + operating main, through the stop motion switch contacts 22, contact 39 of magnet switch 49 to the upper terminals of the relays 40, 41, 42, 43, 44, 45, 46 and 47. The lower terminals of the relays 40, 41, 42 and 43 are open circuited at the contacts of the relays 44, 45, 46 and 47, respectively, hence they cannot operate. While the relays 44, 45, 46 and 47 have their lower terminals connected through the contacts 50 of the relay 49 to the armature brush 51 of the dynamo R, the other brush 52 of the dynamo is connected through the dynamo terminal 32 and wire 31 and contacts 29 to the + operating main, hence the relays 44, 45, 46 and 47 will not as yet operate, since the dynamo remains at rest. The next and final movement of the master switch energizes the switch contact 53, and a circuit may be traced from the + operating main, through the master switch contact 53, contacts of the stop motion switch 19, through the magnet winding of the reversing switch U, through the contacts of the stop motion switch 20, contacts 26 and 25 of the master switch, contacts 54 of the left hand non-interference relay Z, magnet winding 55 of the right hand non-interference relay Z, and by wires 56, 34 and 35 and contacts 30, to the — operating main. The reversing switch U now operates and closes a circuit through the contacts of the high speed switch to the high speed stator winding of the motor. This circuit may be traced as follows: The main II. is already permanently connected to the stator terminal 2, while the mains I. and III. are connected through the potential switch contacts 27 and 28, windings of the overload relays T, T, contacts 57 and 58 of the reversing switch U, and contacts 59 and 60 to the stator terminals 1 and 3, respectively. The high speed stator is now connected to the mains I. II. and III. and a current is induced in the high speed rotor winding, through the entire sectional resistance X. The motor cannot as yet start, since the brake is unable to release itself owing to the resistance 61 in the brake magnet circuit. It will be observed that the brake circuit was completed from the + and — operating mains at the reversing switch contacts 62 and 63, respectively, by the operation of the reversing switch U. Furthermore the brake will not lift even after its circuit is thus completed unless and until the resistance 61 in its magnet circuit be first removed or short circuited. This is effected by means of the safety magnet switch 14, whose contacts 65 form a shunt of zero resistance around this resistance. This safety magnet switch comprises a winding in each phase of the rotor circuit and each of these windings must be fully energized before this magnet will have sufficient power to close its contacts 65 against the action of the spring 66, which means that the relay or safety switch 14 cannot operate unless all of the motor phases are intact and alive, which obviously provides an efficient safeguard against the brake being lifted with one of the motor phases dead or inactive. In order to energize the windings of the safety switch 14, the relay 64 must first close its contacts and since the magnet winding of this relay is connected across the + and — operating mains at the contacts 67 and 68, respectively of the high speed switch H it will at this time be energized to close its contacts, which not only short circuit a portion of the high speed rotor resistance X but also energizes the safety magnet 14 to close its contacts, thereby permitting the brake to lift and at the same time give the motor full starting torque. It will be further observed that since one of the non-interference relays Z has open-circuited the contacts 69 controlled by said relay, and since these contacts are included in a circuit to the reversing switch V, it will be impossible to energize the latter switch, while its companion switch U is energized. This arrangement absolutely precludes the possibility of closing both reversing switches simultaneously, which obviously should never be permitted to occur.

The motor now starts to accelerate and in so doing the potential of the dynamo R gradually builds up and the magnetic strength of the relays 44, 45, 46 and 47, likewise increases. A point is soon reached when the relay 44 is able to close its contacts 70 and in so doing establishes a circuit through the magnet winding of the relay 40, from the + and − operating circuit as before pointed out. The operation of the relay 40 short-circuits a portion of the high speed rotor resistance X and at the same time short circuits the multiple magnet windings of the safety magnet switch 14 and the latter permits the contacts 65 to open and remove the short circuit around the brake resistance 61. Even though these contacts 65 fail to open by the short circuiting of the windings of the safety magnet switch 14, the brake itself will have operated the brake switch 71 and insure that the resistance 61 is again inserted in the brake circuit. This is desirable, since it not only effects an economy of current consumption by the brake, but also guards against any possible overheating of the brake magnet winding. As the motor continues to accelerate the potential of the dynamo R rises still further, until the relay 45 is enabled to close its contacts to effect the energization and operation of the relay 41 attended by a further cutting out of the rotor resistance accompanied by a corresponding increase in motor speed. In like manner the relays 46, 47 and 48, operate gradually and successively to effect the operation of the magnet switches 42, 43 and 49, which short circuit all of the rotor resistance X, and the motor attains normal full speed. The relay 49 is somewhat different than the relays 40, 41, 42 and 43, in that it is provided with back contacts 50 and 39, which are opened as soon as this relay has short circuited the remaining portion of the rotor resistance. Since the contacts 39 are connected to the upper terminals of the relays 40 to 47, inclusive, it follows that the opening of the contacts 39 breaks the circuit for all of the relays 40 to 47, inclusive, and the same become deënergized and drop their contacts.

The opening of the contacts 50 also interrupts the circuit of the relays 44, 45, 46 and 47, at their lower terminals. The relay 48 remains energized, however, since its circuit remains unbroken at the contacts of the stop motion switch 22, and the brush 51 of the dynamo R, and since this relay holds its contacts closed, the final accelerating magnet 49 remains in closed position so as to keep the rotor resistance X short circuited.

It will be observed that the relay 72 has its magnet winding connected across the brushes of the dynamo R, and hence this relay will operate to separate its contacts as soon as the motor M assumes an appreciable speed. As long as the relay 72 maintains its contacts in separated position, it is impossible to close a circuit through the winding of the stopping magnet switch 73, which latter controls the low speed rotor resistance Y.

The hoist is now operating at full normal speed, and as the loaded skip approaches its upper limit of travel near the mouth of the blast furnace, the stop motion S which has been slowly rotating its cam shaft, operates first to open the switch 22. This operation opens the circuit of the relay 48 and the same drops its contacts thereby open-circuiting the final accelerating magnet 49 and the same drops back and inserts the greater portion of the starting resistance X into the high speed rotor circuit, which obviously effects a reduction in the speed of the motor. The magnet switch 64 still remains in energized position, since the circuit of its magnet winding is closed at the contacts 67 and 68 of the high speed switch H, hence a single section of the rotor resistance X remains short-circuited. Shortly after this the stop motion switch 21 opens its contacts which open-circuits the magnet winding of the high speed switch H, and the same connects together the contacts 37, thereby energizing the low speed magnet switch L. This operation open-circuits the high speed stator of the motor, and immediately energizes the low speed stator through the contacts 74 and 75 of the low speed switch which contacts connect the mains I. and III. with the low speed stator terminals 4 and 5, respectively, the stator terminal 2 being permanently connected to the main II. and is common to both the high and low speed stator windings. At this point of change over from the high speed to the low speed windings of the motor, the low speed rotor winding has the resistance Y in circuit with it so that the torque of the motor will not be excessive, as the speed reduces, and the speed reduction will be effected gradually and without shock or jar.

The stopping magnet switch 73 has its winding connected through the contacts of the relay 72 and contacts 76 of the low-speed switch L, and also the contacts 62 of the reversing switch and contacts 29 of the potential switch to the + operating main. The other terminal of this winding is connected through the contacts 63 and 30 to the — operating main, hence it is under the control of the relay 72 whose winding is controlled by the varying potential of the dynamo R.

As the speed of the motor is reduced, the potential of the dynamo R falls off, which weakens the relay 72 to such an extent that the latter drops by gravity and closes its contacts, thereby closing the circuit of the magnet winding of switch 73 across the operating mains and the switch 73 short circuits the resistance Y. The motor, if not handling its maximum load, will tend to accelerate a trifle, and the potential of the dynamo R will correspondingly increase which again effects the operation of the relay 72 to cause the stopping switch 73 again to insert the resistance Y in the circuit of the low speed rotor attended by a reduction in motor speed. In this manner it will be seen that the speed of the motor is controlled by the relays 72 and 73 acting in conjunction, according to the varying potential of the dynamo R, which in turn is dependent for its operation upon the speed and load of the hoisting motor. By this time the skip has substantially reached its final stopping point directly over the mouth of the furnace, and the stop motion switches 20 and 19 operate simultaneously to open circuit both terminals of the magnet winding of the reversing switch U. The reversing switch immediately drops its contacts and the motor circuit is interrupted and the brake applied to stop the hoist and all parts return to normal inoperative position. Should the reversing switch stick in closed position or for some reason refuse to open, a further movement of the hoist opens the stop motion switch 18 to deënergize the potential switch P which cuts off the main line circuit at the contacts 27 and 28. Should the stop motion switch refuse to perform its functions, one of the limit switches Q, Q, will be opened to effect the deënergization and subsequent opening of the potential switch to stop the hoist. The governor switch will effect the same result in case the hoist attain excessive speed at any time during its operation, while the opening of the emergency switch E, or the operation of the switches T, T, due to overload, also effects a like result.

It will be observed that the resistance controlling magnet switches 40, 41, 42, 43, 49, 64 and 73 are operated by current from the main operating line + and —, and not by current taken from the dynamo as are the relays 44 to 48, inclusive, and the relay 72 so that their action is powerful and rapid in that they are never subjected to a varying potential but a potential of constant strength. By this arrangement, I am enabled to maintain a firm closing of the contacts of the aforesaid magnet switches which obviates all danger of arcing and pitting of the heavy current carrying contacts.

The operation of the hoist in a reverse direction is effected in a manner similar to that just described excepting that the reversing switch V will be operated by moving the master switch A in a reverse or left hand direction, while the stop motion switches shown on the left hand side of the cam shaft will operate to slow down and stop the hoist at the proper time and place. In every instance it is intended that the master switch be operated to start the hoist in one direction or the other, while the slowing down and stopping is controlled automatically by the stop motion switch. While this is the proper operation, the operator may control the hoist to a certain extent from the master switch.

It is obvious that those skilled in the art could readily make various changes in the system as shown without departing from the spirit and scope of my invention, hence I desire not to be limited to the precise arrangement and construction of parts herein set forth.

What I claim is:—

1. In a hoist, a load carrying device, an alternating current induction motor connected to operate said device comprising independent windings for effecting different motor speeds, means for closing a circuit to either one of said windings, a resistance in one of said windings, and means controlled by the load for varying said resistance in accordance with the speed of the motor.

2. In a hoist, a load carrying device, an alternating current induction motor operatively connected to the said device comprising independent windings for effecting different motor speeds, means for closing a circuit to either of said windings, a resistance element in circuit with each of said motor windings, and electro-responsive devices controlled by the load for varying said resistances in accordance with the speed of the motor.

3. In a hoist, a load carrying device, an alternating current induction motor operatively connected to the said device comprising independent windings for effecting different motor speeds, means for closing a circuit to either of said windings, a resistance element in circuit with each of said motor windings, an electric generator driven by said motor, and means operated by current from said generator for controlling said resistances, said means being controlled by the load.

4. In a hoist, a load carrying device, an alternating current induction motor operatively connected to the said device comprising independent windings for effecting different motor speeds, means for closing a circuit to either of said windings, a resistance element in circuit with each of said motor windings, a direct current generator driven by said motor, and means operated by current from said generator for controlling said resistances, said means being controlled by the load.

5. In a hoist, a load carrying device, an electric motor operatively connected therewith, a resistance in the motor circuit, an electro-responsive device for controlling said resistance, a relay for controlling a circuit of constant potential to the said electro-responsive device, and means controlled by the load for effecting the operation of said relay.

6. In a hoist, a load carrying device, an electric motor operatively connected therewith, a resistance in the motor circuit, an electro-responsive device for controlling said resistance, a relay for controlling a circuit of constant potential to the said electro-responsive device, and a generator operating in synchronism with the said motor arranged to effect the operation of the relay in accordance with the speed of the motor, said relay being controlled by the load.

7. In a hoist, a load carrying device, an alternating current motor operatively connected therewith comprising high and low speed stator and rotor windings, a resistance in each rotor winding, and means controlled by the load for varying both of said resistances.

8. In a hoist, a load carrying device, an alternating current motor operatively connected therewith comprising high and low speed stator and rotor windings, a resistance in each rotor winding, a source of direct current whose potential varies in accordance with the speed of the motor for controlling said resistances, and means controlled by the load for controlling said direct current.

9. In a hoist, a load carrying device, an alternating current motor operatively connected therewith comprising a plurality of windings on both the stator and rotor for effecting a variable motor speed, a resistance in a rotor winding, and automatic means dependent for its operation upon the load for controlling said resistance.

10. In a hoist, a load carrying device, an alternating current motor operatively connected therewith and comprising fast and low speed windings, a separate switch controlling each winding, automatic means controlled by the load for effecting the operation of said switches, and an operating circuit for one switch controlled by the other switch.

In testimony whereof I have signed my name to this specification in the presence of two witnesses.

DAVID L. LINDQUIST.

Witnesses:
WALTER C. STRANG,
ARTHUR TREZISE, Jr.